United States Patent [19]

Rach

[11] Patent Number: 4,484,760
[45] Date of Patent: Nov. 27, 1984

[54] REMOTE CONTROL HITCH

[76] Inventor: Lester G. Rach, Box 308, Bertha, Minn. 56437

[21] Appl. No.: 434,313

[22] Filed: Sep. 30, 1982

[51] Int. Cl.³ ............................................. B60D 1/10
[52] U.S. Cl. .................................... 280/477; 280/515
[58] Field of Search .......... 280/477, 508, 515, 479 R, 280/415 A; 172/272, 274, 677, 678

[56] References Cited

U.S. PATENT DOCUMENTS

| | | | |
|---|---|---|---|
| 1,804,973 | 5/1931 | Duty | 280/477 |
| 2,478,736 | 8/1949 | Balzer | 280/477 |
| 2,541,755 | 6/1949 | Gehron | 280/478 R |
| 2,556,748 | 6/1951 | Buckley | 280/477 |
| 2,671,673 | 3/1954 | Benson | 280/477 |
| 2,937,887 | 5/1960 | Richman | 280/508 |
| 3,421,780 | 1/1969 | Rimmey | 280/508 |
| 3,744,819 | 7/1973 | Cook et al. | 280/477 |
| 3,912,302 | 10/1975 | Patterson | 280/477 |
| 4,015,855 | 4/1977 | Murray | 280/515 |
| 4,389,058 | 6/1983 | Cadwell | 280/515 |

FOREIGN PATENT DOCUMENTS 198550 12/1957 Austria ............................... 280/508

Primary Examiner—Joseph F. Peters, Jr.
Assistant Examiner—D. Lynn Fugate
Attorney, Agent, or Firm—Burd, Bartz & Gutenkauf

[57] ABSTRACT

A hitch for coupling the tongue of a drawn vehicle to a draw bar has a guiding member and a guided member mutually configured to assume a predetermined relative spatial relation upon engagement with each other. The members have bores which are vertically coaxial in the predetermined relation to receive a clevis pin. One of the members is mounted on the vehicle tongue and the other member is mounted on the draw bar. A power mechanism moves the pin between a first coupling position and a second release position. The power mechanism includes the draft links of a three-point hitch and a power driven winch.

17 Claims, 19 Drawing Figures

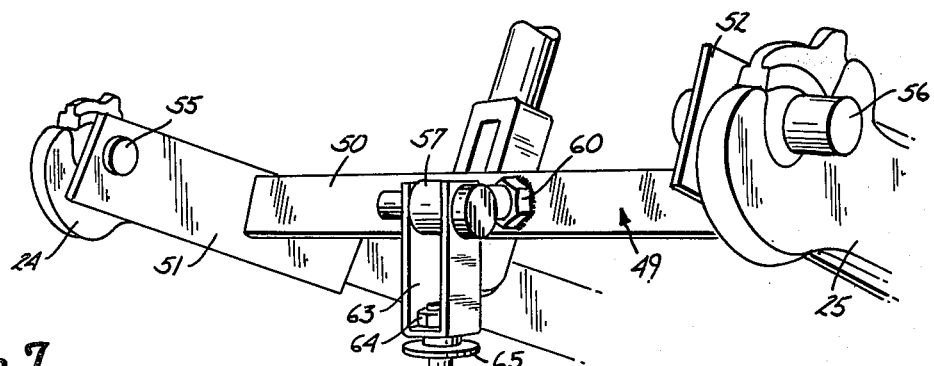
Fig.7
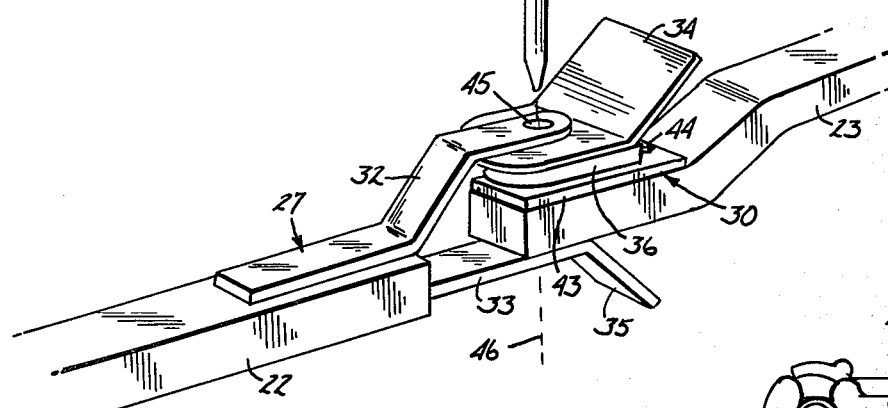
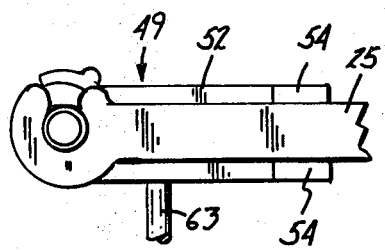
Fig.11
Fig.5
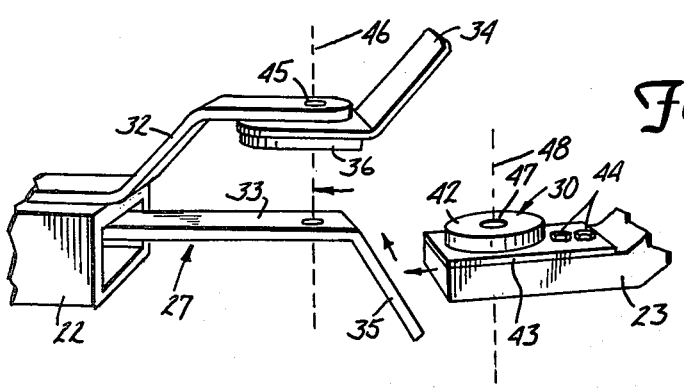
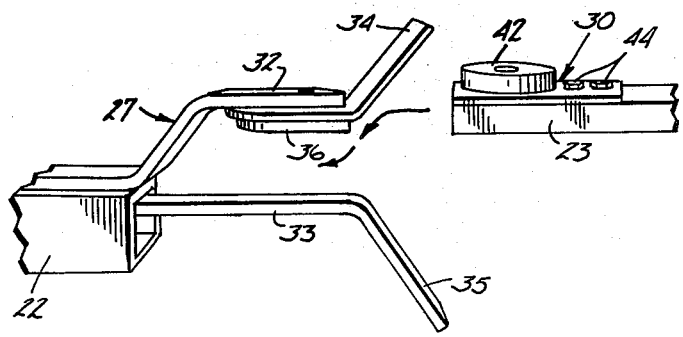
Fig.12

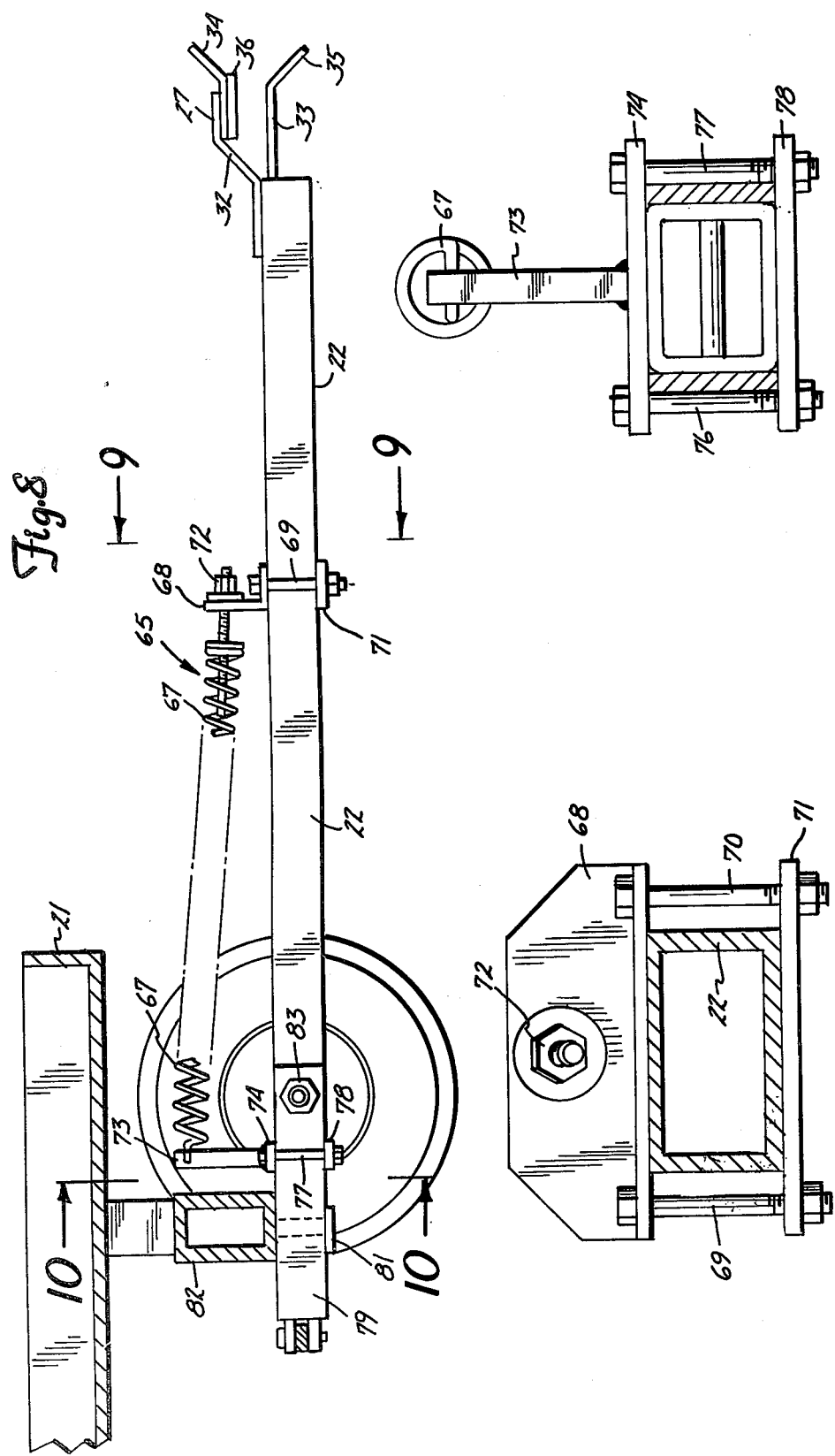

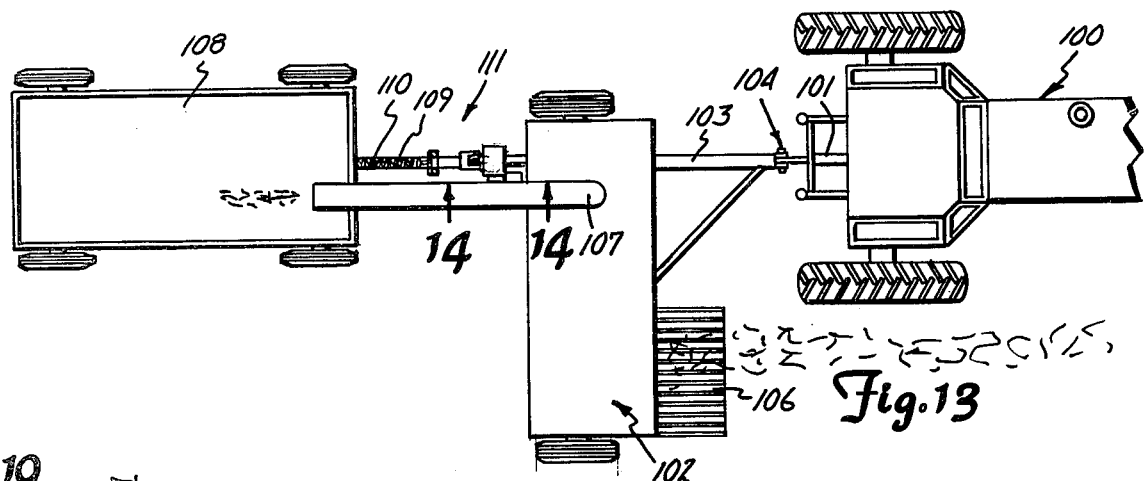
Fig.13
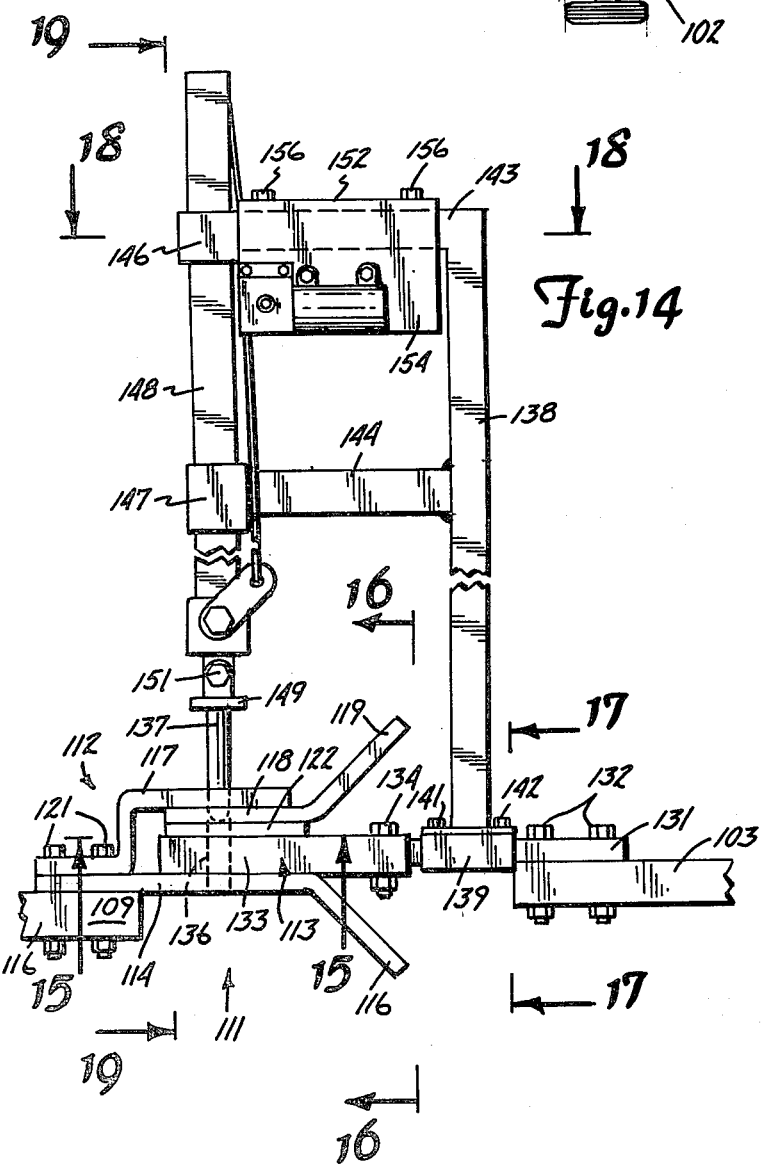
Fig.14
Fig.17

REMOTE CONTROL HITCH

FIELD OF INVENTION

This invention relates to coupling devices used to connect mobile apparatus. The coupling devices are pin hitches for connecting end-to-end vehicles and equipment.

BACKGROUND OF INVENTION

A tractor is a very versatile piece of equipment and one of its standard uses is to tow various implements and vehicles. One of the annoying features of the tractor use has heretofore been the problem of coupling or hitching the tractor to a vehicle to be towed, particularly if only the tractor operator is available for this duty.

The task involves backing the tractor to a rather exact location, dismounting, and raising and holding the vehicle tongue to a height required to engage the tractor draw bar. The operator then remounts the tractor and drives the tractor so as to bring the tongue and draw bar into exactly the right relation. The operator then dismounts the tractor and sets the hitch pin to complete the hitch. This is a difficult procedure when the tractor operator does not have visual contact with the hitch.

Pin hitches are used to couple implements, vehicles, trailers, and wagons to towing vehicles. These hitches have clevis members with holes accommodating removable pins used to connect the clevis members to tractor draw bars. Examples of pin hitches for coupling a tractor to a trailer and the like are described in the following U.S. patents.

Duty in U.S. Pat. No. 1,804,973 shows a trailer having a tongue supported in a horizontal position with a coil spring. The forward end of the tongue is guided with converging plates into a clevis. A pin couples the tongue to the clevis. Balzer in U.S. Pat. No. 2,478,736 shows a hitch having a funnel member for guiding a tongue into a cavity. A pin biased with a spring connects the tongue to the hitch. A latch moved by the tongue releases the pin allowing the spring to bias the pin to a coupling position. Benson in U.S. Pat. No. 2,671,673 describes a hitch having a converging guide ramp for directing a tongue into a clevis cavity. A coupling pin is guided by a lever into aligned holes in the clevis and tongue. Richman in U.S. Pat. No. 2,937,887 uses a trailer hitch and stand to couple a tractor to a wagon. The hitch has a ramp for directing a clevis attached to a tongue into engagement with a trigger. The trigger releases a spring biased pin which moves down to connect the clevis to the draw bar of the tractor. Rimmey in U.S. Pat. No. 3,421,780 shows a wagon tongue biased to a horizontal position with a coil spring. The forward end of the tongue is guided into alignment with a hitch pin. A spring biases the pin to a down hitch position. A cable is used to pull the pin to a release position.

These hitches use springs to bias the hitch pins to connecting positions and manually operated devices, as cables and levers, to move the hitch pins to release positions. In the event that the pins are not in alignment with the holes in the tongue, the springs cannot move the pins to their connecting positions. The operator dismounts the tractor and aligns the holes to allow the pins to drop to connecting positions. An object of the hitch of the invention is to obviate the problems of the prior clevis and coupling pin hitches.

SUMMARY OF INVENTION

The invention relates to a coupler for connecting adjacent mobile devices, such as vehicles, trailers, implements, cars, and the like. The coupler is a hitch that can be connected and disconnected by a remotely located operator.

According to the invention, there is provided a hitch for connecting a movable first device to a movable second device, such as a tractor and a wagon. The hitch has first means connected to the first device and second means connected to the second device. The first and second means are releasably coupled together with pin means. The first means has guide means providing a generally U-shaped socket and a generally upright first hole open to the socket for accommodating the pin means. The second means has a member engageable with the guide means and positionable in the U-shaped socket. The second means has a second hole aligned with the first hole when the member is located in the socket. The pin means is located in the first and second holes to connect the first means to the second means. The pin means is movable to a release position separated from said holes to allow the first means and second means to be separated from each other. Power driven means connected to the pin means operates to move the pin means from the release position and to the draft position and hold the pin means in the draft position. The power driven means also operates to move the pin means from the draft position to a release position. The controls for the power driven means can be located where they are convenient to the operator of a vehicle, so that the pin means may be selectively moved to its draft and release positions by a single operator from a location remote from the hitch.

In one embodiment of the hitch of the invention, a yoke having an upper plate and a lower plate is secured to the forward end of a tongue of a vehicle. The upper plate has an upwardly and forwardly directed upper lip located above a downwardly and forwardly directed lower lip secured to the lower plate. The upper and lower lips provide guide surfaces for a coupler adapted to be connected to the yoke with a hitch pin. The yoke has a guide means providing a generally U-shaped socket. The coupler has a member engageable with the guide means and positionable in the U-shaped socket. The yoke and coupler have vertically aligned holes when the member is located in the socket or accommodate the hitch pin. A power driven means connected to the hitch pin is selectively operable to move the hitch pin to a draft position in the vertically aligned holes in the yoke and coupler and a release position spaced from the yoke and coupler.

In one arrangement of the hitch, the power driven means includes a frame mounted on the draft links of a three-point hitch of a tractor. The draft links are selectively moved up and down by the hydraulic control system of the tractor. The hitch pin is connected to the frame and moves with the frame mounted on the draft links. In a second arrangement of the hitch, the power driven means is supported on a frame connected to a part of the coupler. The power driven means include means for guiding the pin means in a generally up and down direction and power means for moving the pin means up to a release position and down to a draft position. The power means includes a reversible electric motor operably connected to a winch having cables connected to the means for guiding the pin means. A switch means remotely located from the motor is used to connect the motor to a source of electrical power and thereby operate the motor and drive the winch means to move the pin means in up and down directions.

The tongue of the vehicle supporting the yoke is biased to a generally horizontal position. An elongated coil spring has a forward end mounted to a bracket secured to the tongue. A bracket mounted on the tongue yoke is attached to the rear of the spring. The tension on the spring is adjusted to control the elevation of the tongue.

The hitch is versatile in use, as it is useable to connect a large number of different devices, vehicles, implements, trailers, cars, and like movable apparatus. The hitch is reliable in use and can be operated with a single operator from a remote position, such as the driver's cab of a tractor. The hitch pin is held in the draft position to prevent inadvertent uncoupling of the hitch.

IN THE DRAWINGS

In the drawings, in which like reference numerals indicate corresponding parts throughout the several views, FIG. 1 is a plan view of a vehicle coupled to a tractor with the hitch of the invention;

FIG. 6 is an enlarged sectional view taken along line 6—6 of FIG. 2;

FIG. 7 is a perspective view of the hitch showing the hitch pin in its raised position;

FIG. 8 is an enlarged sectional view taken along line 8—8 of FIG. 1;

FIG. 9 is an enlarged sectional view taken along line 9—9 of FIG. 8;

FIG. 10 is an enlarged sectional view taken along line 10—10 of FIG. 8;

FIG. 11 is a perspective view of the yoke and tongue follower showing movement of a low tongue during connection of the hitch;

FIG. 12 is a perspective view of the yoke and tongue follower showing movement of a high tongue during connection of the hitch;

FIG. 13 is a plan view of an implement connected to a tractor and a wagon with the hitches of the invention;

FIG. 14 is a side elevational view of a hitch view along line 14—14 of FIG. 13;

FIG. 17 is an enlarged sectional view taken along line 17—17 of FIG. 14;

DESCRIPTION OF PREFERRED EMBODIMENTS

Figure 1:
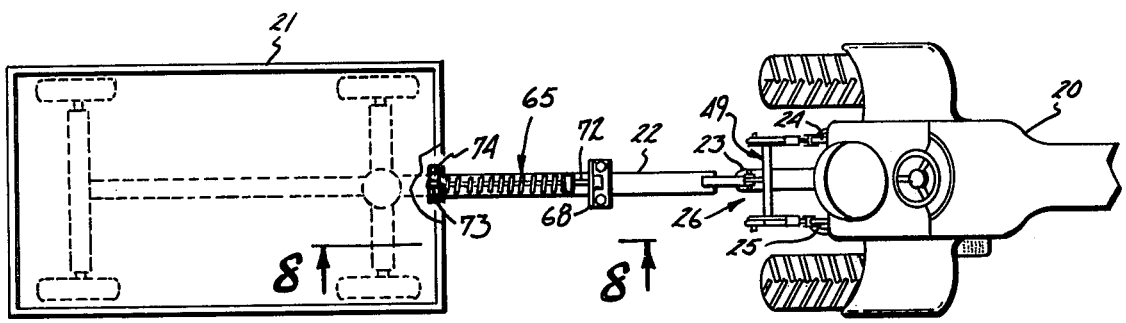

Turning first to FIG. 1, there is shown a tractor 20 drawing a vehicle 21, such as a wagon. Tractor 20 is a conventional agricultural tractor euipped with a draw bar 23 and a three-point hitch, including draft links 24 and 25. Draft links 24 and 25 are pivoted to up and down positions with the hydraulic power system of the tractor. Other vehicles, such as trucks, can be used to tow vehicle 21. Other types of movable apparatus, such as trailers, agricultural implements, freight cars, and the like, can be connected to tractor 20 with the hitch of the invention.

Figure 3:
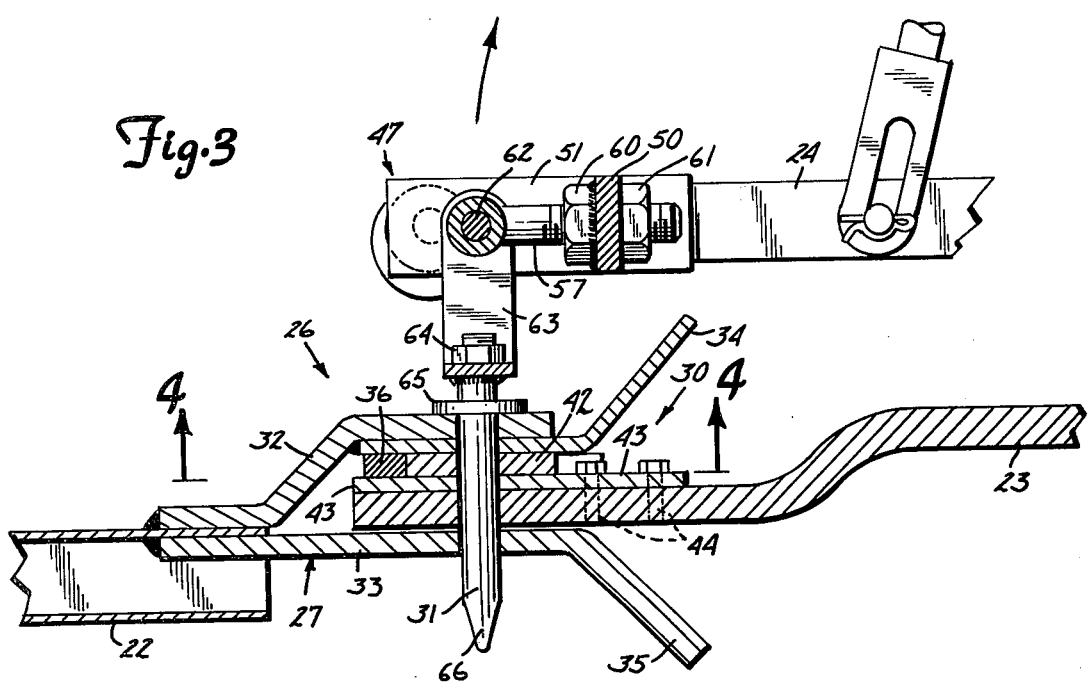
FIG. 3 is a fragmentary vertical sectional view taken along line 3—3 of FIG. 2.

Vehicle 21 has a forwardly projected tongue 22. A hitch 26, according to the invention, connects draw bar 23 to tongue 22. As shown in FIG. 3, hitch 26 has a first unit or yoke 27 secured to the forward end of tongue 22 and a second unit or coupler 30 secured to the rear end of draw bar 23. A hitch pin 31 mounted on draft links 24 and 25 operates to connect yoke 27 and coupler 30. Pin 31 is moved in response to movement of draft links 24 and 25 to a down or draft position and an up decoupled or release position.

As shown in FIGS. 3 and 7, yoke 27 is a clevis assembly having an upper plate 32 and a lower plate 33. The trailing ends of plates 32 and 33 are secured by welds to the forward end of tongue 22. Fasteners, including bolts and clamps, can be used to attach plates 32 and 33 to tongue 22. Plate 32 has a forwardly and upwardly directed lip 34. Plate 33 has a forwardly and downwardly directed lip 35 vertically aligned with lip 34. Lips 34 and 35 serve as guides to direct coupler 30 and to the socket of yoke 27.

Figure 4:
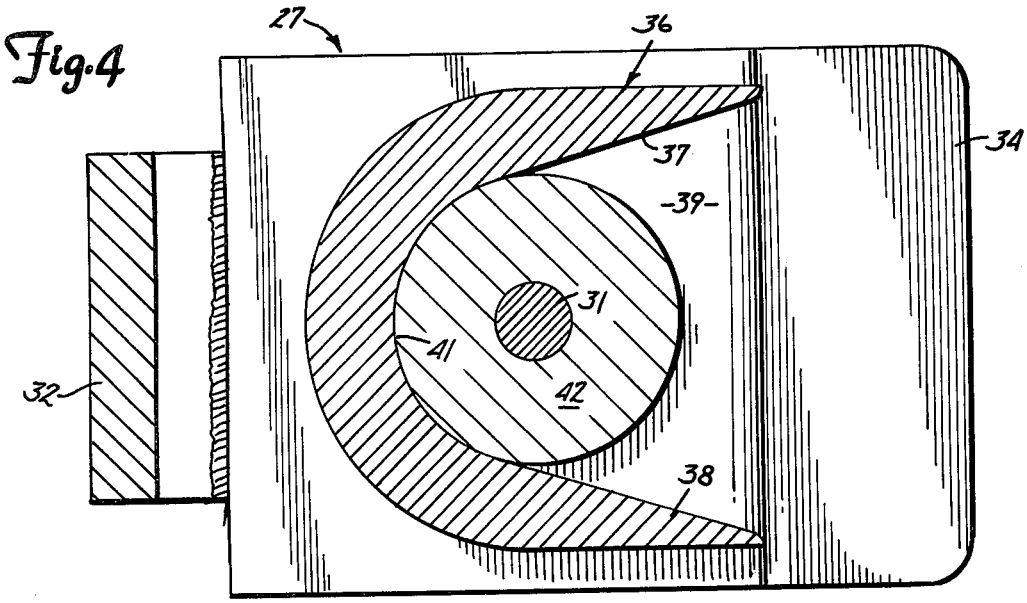
FIG. 4 is an enlarged sectional view taken along line 4—4 of FIG. 3.

As shown in FIG. 4, a generally U-shaped guide member 36 is secured to the bottom of plate 32. Guide member 36 has forwardly and outwardly directed arms 37 and 38 forming a forwardly open socket 39. Arms 37 and 38 are joined to a concave curved rear wall 41. Arms 37 and 38 and rear wall 41 form a socket or pocket for a coupling or follower member 42. Coupling member 42 is a circular disc secured to the top of draw bar 23 with a plate 43 attached to draw bar 23 with a plurality of bolts 44. Plates 32 and 33 have vertically aligned holes 45 along vertical axis 46 for accommodating hitch pin 31. As shown in FIG. 11, coupling member 42 has a vertical hole 47 aligned with the hole in the end of draw bar 23 along a vertical axis 48. When coupler 30 is in connecting relationship relative to yoke 27, holes 45 and 47 are vertically aligned along axis 46 so that hitch pin 31 can connect coupler 30 to yoke 27. As shown in FIG. 4, the radius of the circular disc of coupling member 42 is substantially the same as the radius of curvature of rear wall 41 of guide member 36. When coupling member 42 is located in the socket and in engagement with the rear wall 41, holes 45 and 47 are in vertical alignment so that they can accommodate hitch pin 31, as shown in FIG. 3. The vertical space between plates 32 and 33 is generally the same as the combined thickness of draw bar 23, carrier plate 43, and coupling member 42.

Figure 2:
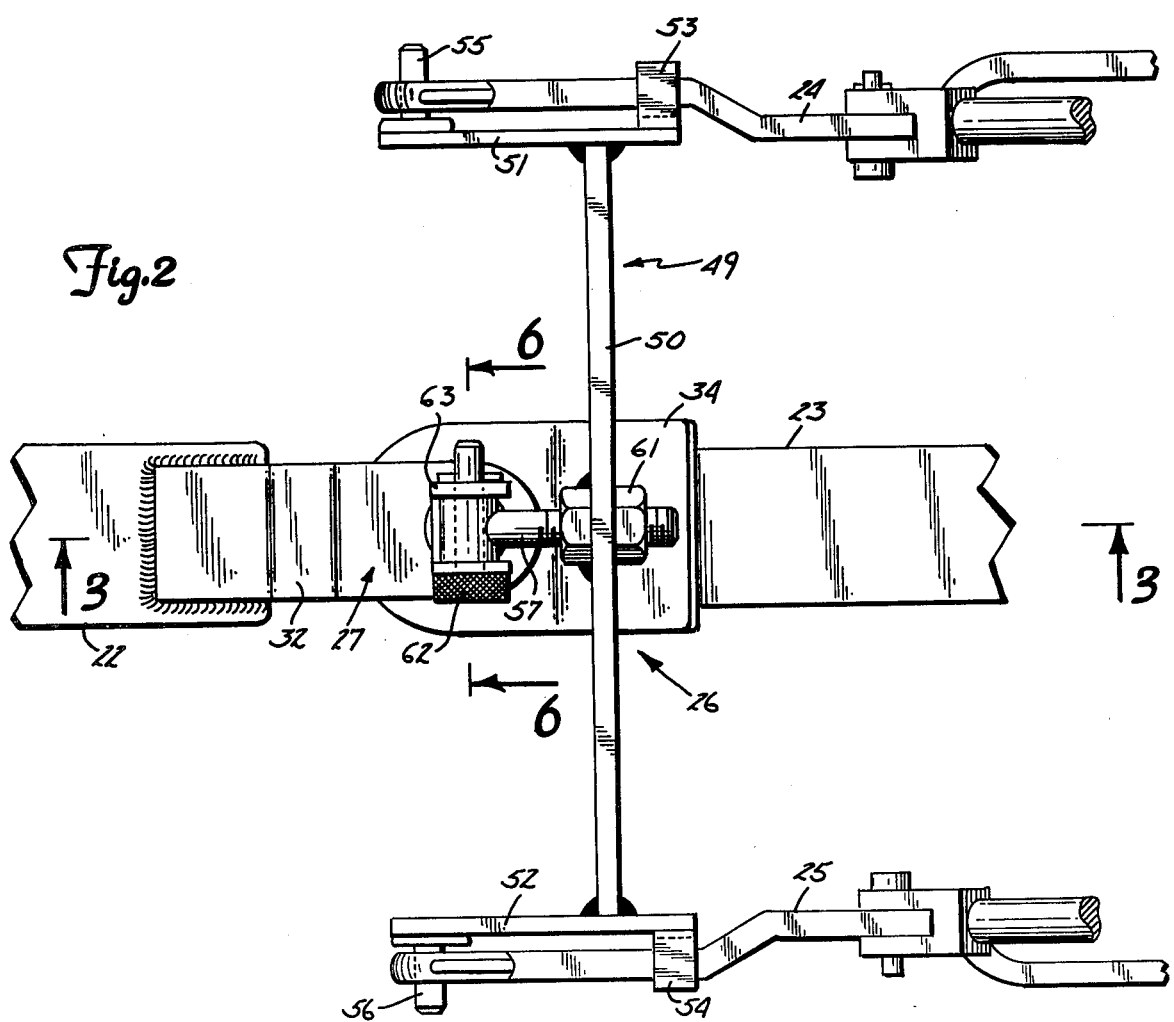
FIG. 2 is an enlarged plan view of the hitch of FIG. 1.

As shown in FIGS. 2 and 7, clevis pin 31 is mounted on draft links 24 and 25 by a frame 49. Frame 49 is removably mounted on the ends of draft links 23 and 24 to permit rapid connection of the hitch to the tractor. Frame 49 has a cross bar 50 and end plates 51 and 52 secured to opposite ends of cross bar 50.

Figure 5:
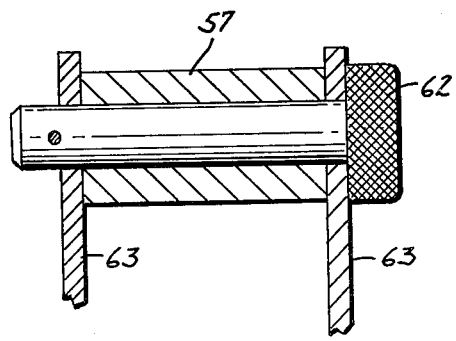
FIG. 5 is a fragmentary side elevational view of the right side of draft link 25 and frame for supporting the hitch pin.

As shown in FIGS. 2 and 7, hitch pin 31 is mounted on the draft links 24 and 25 with a frame 49. Frame 49 has a cross bar 50 and end plates 51 and 52, which allow the frame to be removed from the draft links. End plate 51 has a pair of lateral ears 53 located adjacent the upper and lower sides of draft link 24. A pin 55 secured to plate 51 is located in the jaw of draft link 24. As shown in FIG. 5, end plate 52 has a pair of lateral ears 54 straddling draft link 25. A pin 56 secured to plate 53 extends into the jaw of draft link 25. The ear and link structure mounts the frame on the draft link so that it moves with the draft link. An eye bolt is secured to the middle of cross bar 50 by nuts 60 and 61. A pin 62 extended through a hole in the head of eye bolt 57 pivotally supports a U-frame 63 secured to the top of hitch pin 31. A nut 64 attaches the top of pin 31 to frame 63. Hitch pin 31 has a shoulder 65 engageable with the top of plate 32 when it is in the down or draft position. Pin 31 is so located with respect to draft links 24 and 25 and draw bar 23 that, when the draft links are moved down, the forward tapered end 66 of hitch pin 31 enters the hole 47 to locate pin 31 coincident with axis 48 and thereby connects yoke 47 to end coupler 30.

Tractor draw bar 23 is conventionally at a fixed distance from the ground. In order to enable automatic coupling of the hitch, vehicle 22 must be positioned so that yoke 27 is in generally the same height above the ground as coupling 30. One means for accomplishing this comprises the use of biasing means to hold tongue 22 in an elevated position, as shown in FIGS. 1 and 8. Tongue 22 is horizontally supported with a coil spring assembly 65. Coil spring assembly 65 comprises a spring 67 having a forward end attached to a bracket 68 clamped to the mid-portion of tongue 22 with bolts 69 and 70 and a bar 71. A nut and bolt assembly 72 connecting spring 67 to bracket 68 is used to adjust the elevation of tongue 22. When the nut is turned, the tension on the spring is adjusted to control the elevation of the tongue 22. The rear end of spring 67 is attached to an upright arm 73 secured to a bar 74. As shown in FIG. 10, bar 74 is clamped to the rear tongue yoke 79 with bolts 76 and 77 and bar 78, whereby spring 67 biases tongue 22 to its horizontal position.

A king pin 81 mounts tongue yoke 79 to the mid-portion of the front frame 82 of vehicle 71 so that yoke 79 and tongue 22 pivot about an upright axis. A transverse pivot bolt 83 connects tongue 22 to yoke 79. Arm 73, being mounted on yoke 79, angularly moves with yoke 79 and tongue 22, thereby maintaining the same tension on spring 67 when tongue 22 is turned right or left. The tongue 22 does not move up and/or down when it is turned from the forward longitudinal position.

In use, a tractor 29 having a coupling 30 on draw bar 23 and pin 31 on frame 47 mounted on draft links 24 and 25 is backed toward a vehicle having a yoke 27 which has been adjusted to height, as described above. The draft links 24 and 25 are raised to locate pin 31 in the up position. The tractor operator uses the three-point hitch control valve to control the movement of draft links 24 and 25 thereby moving pin 31 up and down with the force of the hydraulic power means that moves the draft links. Because of unevenness of the ground, or for various other reasons, the yoke 27 will probably not be in perfect alignment with coupling 30. FIG. 9 shows that if yoke 27 is too high, draw bar 23 engages guide lip 35 forcing tongue 22 downward against the force of spring 67, until member 25 can move into member 46, as shown in FIG. 4. Pin 31 hangs vertically by gravity, and as the draft links are lowered, pin 31 passes through aligned holes 45 and 47 in both to hitch vehicle 21 to tractor 20.

FIG. 12 shows that if yoke 27 is too low, member 42 engages guide lip 34, lifting tongue 22 until member 42 can move into the yoke socket of U-shaped member 36. The draft links 24 and 25 are lowered in insert pin 31 through the aligned holes 45 and 47 to complete the coupling.

At any time it is desired to uncouple the tractor from a vehicle, it is only necessary to raise draft links 24 and 25, thus drawing pin 31 upward out of yoke 27 and coupling 30. The tractor 20 can then be driven away, the tongue 22 of the vehicle rising or dropping slightly according to the ground surface, remaining at a height which enables recoupling later when desired.

Referring to FIG. 13, there is shown a modification of the hitch of the invention employed with a tractor 100 having a draw bar 101. The tractor is coupled to a forage harvester 102 having a frame 103 with a forwardly directed tongue. A hitch indicated generally at 104 connects the tractor draw bar to the tongue of forage harvester 102. Hitch 104 is identical to the hitch 26, as shown in FIGS. 1–12.

Forage harvester 102 is a conventional agricultural implement having a forage pickup unit 106 and a rearwardly directed discharge chute 107 for directing material into a self-unloading wagon 108. Wagon 108 has a forwardly directed tongue 109. A spring assembly 110 holds the tongue 109 in a generally horizontal position. Spring assembly 110 is identical to the spring assembly 65, as shown and described with reference to FIGS. 8, 9, and 10.

A hitch indicated generally at 111 connects tongue 109 to the rear portion of frame 103. Hitch 111 is remotely operated so that the tractor operator can connect and disconnect the hitch without leaving the cab of tractor 100. Referring to FIG. 14, hitch 111 comprises a yoke 112 secured to the forward portion of tongue 109 and a coupler 113 connected to frame 103. Yoke 112 has a lower plate 114 having a forward end inclined downwardly and forwardly to form a generally flat lip 116. Located above lower plate 114 is an upper plate 117 having a guide plate 118. The forward portion of guide plate 118 extends upwardly and forwardly forming a generally flat lip 119. Lips 116 and 119 converge rearwardly to the pocket of yoke 112 that accommodates the rear end of coupler 113. A pair of nut and bolt assemblies 121 mount the plates 114 and 116 on the forward end of tongue 109.

Figure 15:
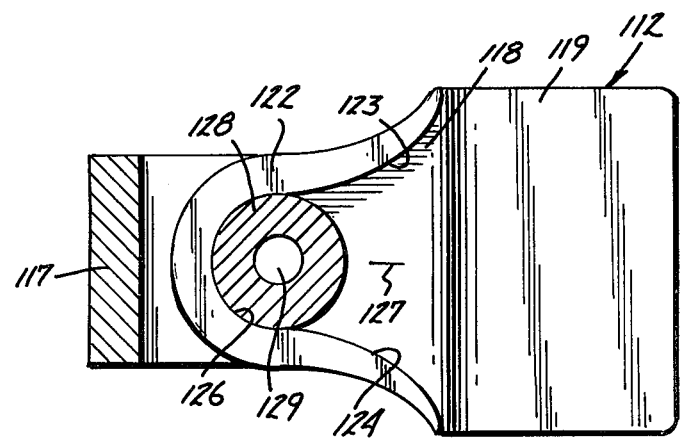
FIG. 15 is an enlarged sectional view taken along line 15—15 of FIG. 14.
Figure 16:
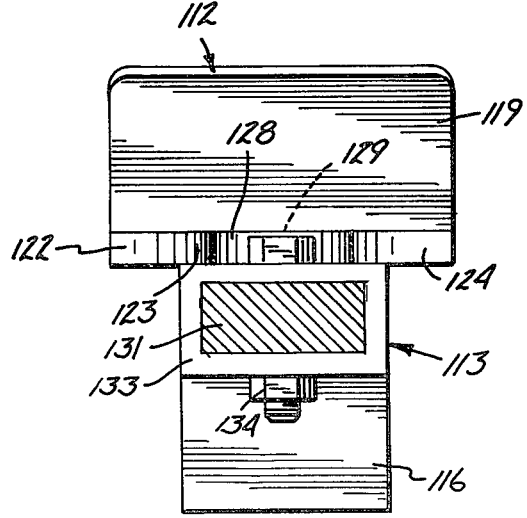
FIG. 16 is an enlarged sectional view taken along line 16—16 of FIG. 14.

As shown in FIG. 15, generally U-shaped member 122 is secured to the lower side of plate 118. Member 122 has rearwardly converging side walls 123 and 124 and a concave curved back wall 126 forming a generally U-shaped socket 127. The side walls 123 and 124 provide guide surfaces for directing the follower member 128 of coupler 113 into the socket 127. Follower member 128 is a cylindrical boss having a central hole 129. A longtiudinal draw bar 131 is secured to the frame 103 with a plurality of nut and bolt assemblies 132. A tubular member 133 fits over the rear end of the draw bar 131 and is attached thereto with a nut and bolt assembly 134. The follower member 128, as shown in FIG. 16, is secured to the top of tubular member 133. Draw bar 131 and tubular member 133 have aligned holes 136 for accommodating a hitch pin 137.

Figure 19:
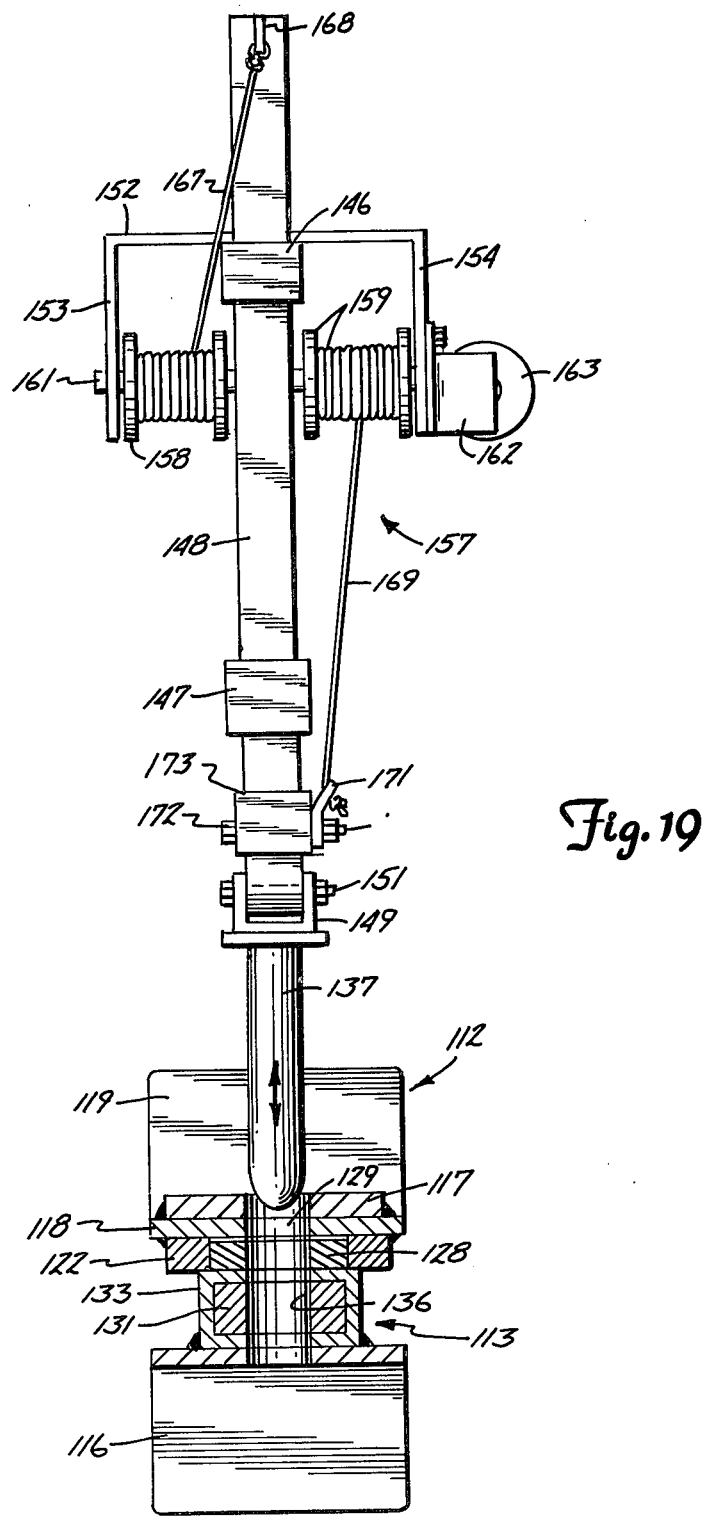
FIG. 19 is an enlarged sectional view taken along line 19—19 of FIG. 14.

Hitch pin 137, shows in FIGS. 14 and 19, is movable in generally up and down directions to a down draft position coupling yoke 112 with a coupler 113 and an up release position. When pin 137 is in the release position, wagon 108 is disconnected from forage harvester 102. Hitch pin 137 is powered down to the hitch or draft position and powered up from the draft position to a release position with power means hereinafter described. The power means is remotely controlled by the operator from the cab of tractor 100, whereby the wagon 108 can be connected and disconnected from the forage harvester 102 by the tractor operator.

Figure 18:
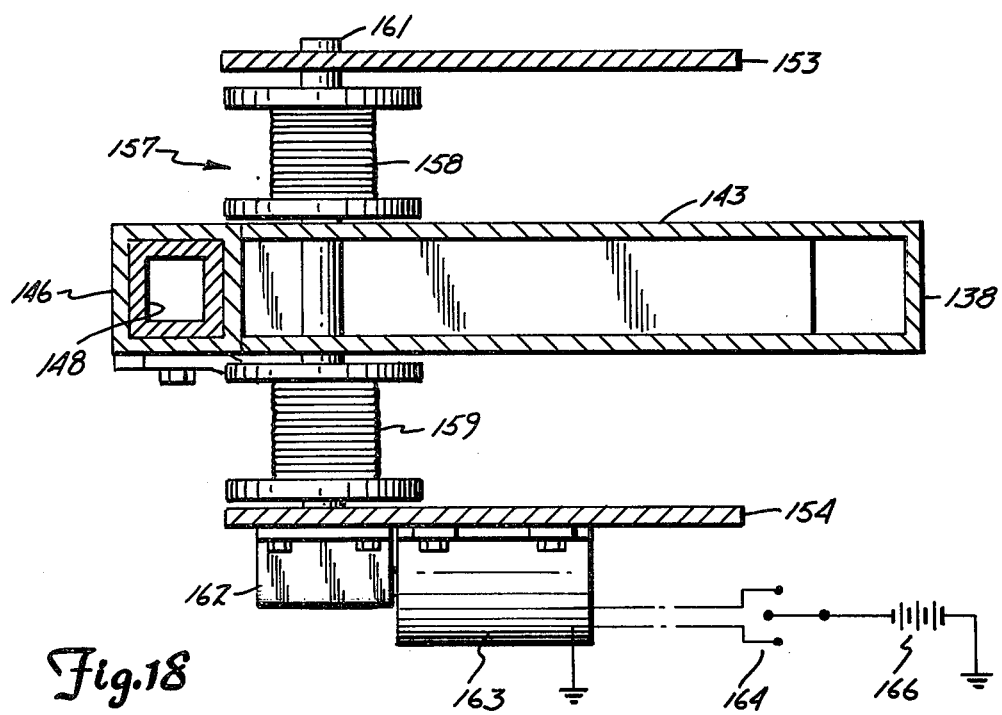
FIG. 18 is an enlarged sectional view taken along line 18—18 of FIG. 14.

Hitch pin 137 is movably mounted on a frame 138 extended over coupling 113. Frame 138 has a foot 139 comprising a generally inverted U-shaped or channel member secured to draw bar 131 with a plurality of nut and bolt assemblies 141 and 142. Frame 138 has vertically spaced horizontal arms 143 and 144. The outer ends of arms 143 and 144 have square sleeves 146 and 147 accommodating an upright member 148. As shown in FIG. 18, member 148 has a generally square shape and is accommodated within the square openings of square sleeves 146 and 147. Hitch pin 137 has a generally U-shaped head 149 secured with a nut and bolt assembly 151 to the lower end of member 148. Member 148 aligns hitch pin 137 with hole 129 in member 128.

Referring to FIGS. 14, 18, and 19, a support 152 having downwardly directed side walls 153 and 154 is mounted on arm 143 with a pair of bolts 156. Side walls 153 and 154 support a winch indicated generally at 157 operable to move member 148 up and down and thereby move hitch pin 137 to its draft position and release position. Winch 157 comprises a pair of spools 158 and 159 mounted on a shaft 161. Opposite ends of shaft 161 are rotatably mounted on suitable bearings secured to side walls 153 and 154. Shaft 161 is drivably connected to a gear box 162 mounted on side wall 154. An electric D.C. reversible electric motor 163 mounted on side wall 154 drives gear box 162. Motor 163 is connected to a three-way switch 164 operable in two positions to supply electric motor 163 with electric power from a battery 166, such as a 12-volt battery of vehicle 100. The three-way switch 164 is operable in a first position to drive the motor in one direction and a second position to drive the motor in an opposite direction, thereby selectively operating the winch 157 in opposite directions.

As shown in FIG. 19, a first cable 167 wound about spool 168 is connected to the upper end of member 148 with an ear 168. A second cable 169 wound about spool 159 extends downwardly and is connected to a tab 171. A bolt 172 secures tab 171 to a collar 173 and the lower end of member 148. Cables 167 and 169 are wound in opposite directions on spools 158 and 159, respectively, so that on rotation of shaft 161 in one direction, member 148 is moved up and rotation of shaft 161 in the opposite direction moves member 148 down.

In use, the forage harvester 102 is backed by tractor 100 to locate coupler 113 in yoke 112. The guide lips 116 and 119 elevate coupler 113. The guide member 122 directs the follower member 128 into the U-shaped socket whereby holes 129 and 136 are aligned with the hitch pin 137. The operator merely operates switch 124 to energize the electric motor 123. This operates the winch 157 to move the hitch pin 137 down into the draft position, as shown in broken lines in FIG. 19. Winch 157 is used to hold the draft pin 137 in the draft position. Wagon 108 is disconnected from the top of forage harvester 102 by reversing the position of switch 164 so that motor 163 drives the gear box 162 in a reverse direction. causing the winch 157 to move member 148 in an upward direction thereby retracting hitch pin 137 from yoke 112 and coupler 113.

The draw bars of agricultural tractors and implements, such as draw bars 23 and 131, vary in widths and cross sectional area. Plate 43, shown in FIGS. 3 and 7, can be replaced with a square tube having a passage accommodating the draw bar. A single nut and bolt assembly secures the tube to the draw bar. Set screws in the side of the tube prevent lateral movement of the tube on the draw bar. Follower member 42 is secured by welds or the like to the top of the tube. The tube bar has holes aligned with the hitch pin hole in the draw bar and hole in the follower member 42. The square tube can be used with different sizes of draw bars without altering the structure of the draw bars.

Plate members 32 and 33, shown in FIGS. 3 and 7, as welded to tongue 22, can be clamped on the forward end of the tongue. A clamp structure comprising a pair of plates having diverging lips, such as lips 34 and 35, are located adjacent the top and bottom of conventional hitch plates on the front of a wagon tongue. A nut and bolt assembly extended through the hitch pin hole in the hitch plates clamps the pair of plates onto the hitch plates. A pair of nut and bolt assemblies located adjacent opposite sides of the tongue clamp the pair of plates onto the tongue. The clamp structure is removable from the tongue without changing or removing any part of the conventional hitch plate.

Numerous characteristics and advantages of the invention have been set forth in the foregoing description, together with details of the structure and function of the invention, and the novel features thereof. The disclosure, however, is illustrative only, and changes may be made in detail, especially in the matters of shape, size, and arrangement of parts, within the principle of the invention, to the full extent indicated by the broad general meaning of the terms in which the appended claims are expressed.

The embodiments of the invention in which an exclusive property or privilege is claimed are defined as follows:

1. A hitch for connecting a movable first device to a movable second device comprising: first means connected to said first device, said first means having guide means providing a generally U-shaped socket and a generally upright first hole open to said socket, said first means including a yoke having an upper plate having a forwardly and upwardly directed upper lip, and a lower plate spaced below said upper plate, said lower plate having a forwardly and downwardly directed lower lip, said guide means being secured to a portion of the upper plate facing the lower plate with the U-shaped socket open towards said upper lip, second means connected to said second device, said second means having a member engageable with said guide means and positionable in said U-shaped socket, and a second hole aligned with the first hole when the member is located in said socket, pin means movable to a draft position and a release position, said pin means when in the draft position being located in said first and second holes to connect the first means to the second means, said pin means when in the release position being separated from said holes thereby allowing the first means and second means to be separated from each other, and power driven means connected to said pin means operable to move said pin means from said release position to said draft position and from said draft position to said release position, said power driven means includes means for guiding the pin means in generally up and down directions and frame means mounted on the draft links of a tractor, and power means for moving the pin means up to said release position and down to said draft position, said power means includes hydraulic power means for moving the draft links.

2. The hitch of claim 1 wherein: said guide means has forwardly side walls and a concave curved rear wall forming said socket, said member having a convex curved portion engageable with said rear wall when the member is located in said socket.

3. The hitch of claim 1 wherein: said second device includes a tongue, said second means being connected to said tongue, and means for maintaining the tongue in a generally horizontal position above the ground to a line via second means with the first means.

4. The hitch of claim 3 wherein: said means for maintaining the tongue in a horizontal position above the ground includes a fixed support, a bracket mounted on the tongue and elongated coil spring connected to the support, and adjustable means connecting the spring to the bracket, said adjustable means being operable to adjust the height of the tongue above the ground.

5. The hitch of claim 1 wherein: the first device includes a tongue connected to the first means, and means for maintaining the tongue above the ground to align the first means with the second means.

6. A hitch for connecting a first movable device to a movable second device comprising: first means connected to the first device, sid first means having guide means providing a generally U-shaped socket and a generally upright first hole open to said socket, said second device having an elongated tongue, biasing means connected to said tongue to hold said tongue in a generally horizontal position, second means connected to the tongue, said second means having a member engageable with said guide means and positionable in said U-shaped socket and a second hole aligned with the first hole when the member is located in the socket, pin means movable to a draft position and a release position, said pin means when in a draft position being located in said first and second holes to connect the first means to the second means, said pin means when in the release position being separated from the said hole, thereby allowing the first means and the second means to be separated from each other, means for guiding the pin means including an upright member secured to the pin means, frame means mounted on the first means having means for controlling up and down movement of the upright member, and power means comprising winch means having cable means connected to said upright member, operable to move said pin means to said release position to said draft position and from said draft position to said release position, and motor means for driving the winch means whereby said cable means moves the upright member in up and down directions.

7. The hitch of claim 6 wherein: said motor means is a reversible electric motor, and remote located switch means operable to connect the electric motor to an electric power supply.

8. The hitch of claim wherein: the first means includes a first plate and a second plate laterally spaced from the first plate, said guide means comprising a U-shaped member located between said plates and secured to said first plate, said U-shaped member having said U-shaped socket.

9. The hitch of claim 8 wherein: said U-shaped member has forwardly diverging said walls and a concave curved rear wall joined to said side walls forming said U-shaped socket.

10. A hitch for coupling the tongue of a drawn vehicle to the draw bar of a tractor having vertically movable draft links comprising:
guiding means and coupling means mutually configured to assume a predetermined relative spacial relation upon engagement, said guiding and coupling means having holes which are vertically coaxial in said predetermined relation;
connecting structure attaching one of said means on the vehicle tongue, means mounting the other means on the tractor draw bar;
a hitch pin; and
means mounting said pin on said draft links for movement with said draft links between a first position, in which said pin passes through said holes, and a second position, in which said pin is moved out of said holes.

11. The hitch of claim 10 wherein: said guiding means includes a generally horizontal plate and guide means secured to said plate, said guide means having a generally U-shaped socket for accommodating the coupling means.

12. The hitch of claim 11 wherein: said plate has a forwardly and upwardly directed lip.

13. The hitch of claim 11 wherein: said guiding means includes a generally horizontal second plate located below said first horizontal plate, said coupling means being engagable with said second plate to support the coupling means.

14. The hitch of claim 11 wherein: said coupling means has a convex surface of a size to fit into said U-shaped socket.

15. The hitch of claim 10 wherein: said means mounting said pin on the draft links comprises a frame extended between the draft links, said frame having means releasably mounting the frame on the draft links.

16. The hitch of claim 10 including: means for maintaining the forward end of said tongue at a height above ground related to the height of the draw bar above the ground.

17. The hitch of claim 10 including: a cross bar extended between the draft links, means mounting the cross bar on said draft links, and means connecting the hitch pin to the cross bar.

* * * * *